Figure 1:
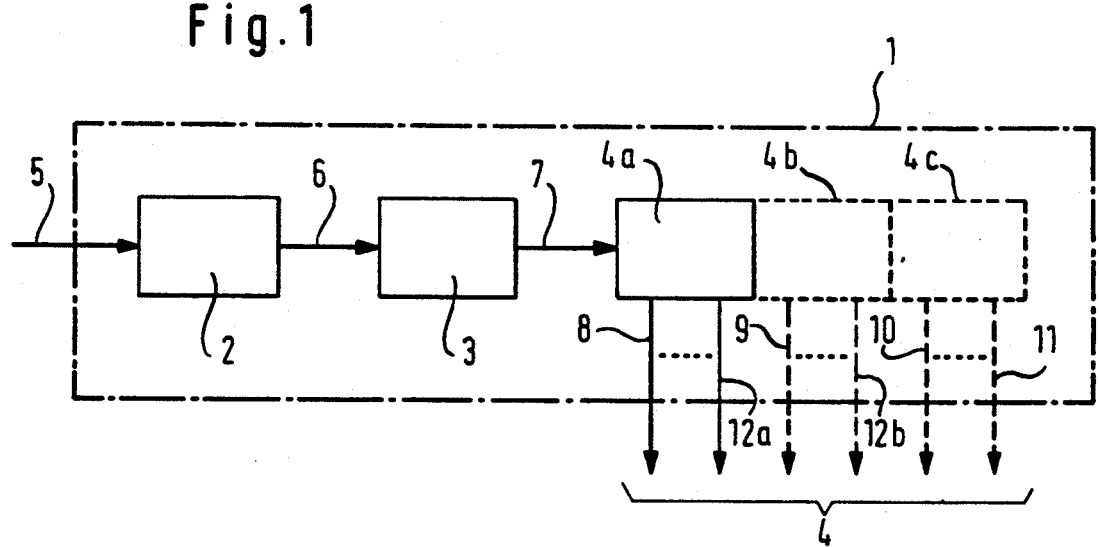

United States Patent [19]
Hohenester

[11] Patent Number: 5,205,777
[45] Date of Patent: Apr. 27, 1993

[54] PROCESS AND APPARATUS FOR PROCESSING MEAT

[76] Inventor: Hermann Hohenester, Strass 21, D-8269 Burgkirchen-Alz, Fed. Rep. of Germany

[21] Appl. No.: 652,581

[22] Filed: Feb. 8, 1991

[30] Foreign Application Priority Data

Nov. 28, 1990 [EP] European Pat. Off. ........ 90122740.5

[51] Int. Cl.$^5$ .............................................. A22C 9/00
[52] U.S. Cl. .................................. 452/142; 452/141; 100/171; 100/211
[58] Field of Search ...................... 452/144, 141, 142; 100/94, 121, 139, 155 R, 161, 163 R, 211, 212

[56] References Cited

U.S. PATENT DOCUMENTS

| | | | |
|---|---|---|---|
| 3,631,794 | 1/1972 | Wehner | 100/121 |
| 3,962,751 | 6/1976 | Wagner | 452/142 |
| 4,531,259 | 7/1985 | Bridge, Jr. | 452/142 |
| 4,712,472 | 12/1987 | Meisen et al. | 100/211 |
| 4,815,165 | 3/1989 | Gibson | 452/141 |

FOREIGN PATENT DOCUMENTS

| | | | |
|---|---|---|---|
| 27301 | 4/1981 | European Pat. Off. | 452/141 |
| 1464 | 1/1988 | Japan | 452/141 |
| 8800786 | 10/1989 | Netherlands | 452/142 |

*Primary Examiner*—Willis Little
*Attorney, Agent, or Firm*—Barry Evans

[57] ABSTRACT

In order to achieve a degree of separation of muscular tissue from bones, ligaments, cartilage, fascia, connective tissue, fatty tissue and the like which is as high as possible for a careful treatment, a process and an apparatus for processing meat is proposed in which the meat is cut up by dividing this into planar pieces of a certain thickness in a cutting device, after which a mechanical tenderizing of the planar pieces of meat of a certain thickness takes place in a tenderizing device in a second step, and a single- or multi-stage separating process takes place in a separating device in a further step, the mechanical tenderizing of the planar pieces of meat in the second step being precisely matched with the separating process in the further step.

49 Claims, 2 Drawing Sheets

PROCESS AND APPARATUS FOR PROCESSING MEAT

The present invention relates to a process and an apparatus for processing meat, the meat being cut up in a first step and subjected to a single or multi-stage separating process in a subsequent further step.

It is necessary to process the meat for the manufacture of meat products. This processing consists of separating the actual muscular tissue from bones, ligaments, cartilage, fascia, connective tissue, fat and the like. The "pure" muscular tissue obtained in this manner can then be processed further into the desired meat product, while the separated constituents are processed for other purposes, further treated or disposed of in separate processes.

The separation of the muscular tissue from the constituent parts mentioned above presents considerable problems in practice. The solid constituents, for example the bones or cartilage are relatively easily and completely separated from the soft constituents such as the muscular tissue and the fat. It is, however, considerably more difficult when relatively soft constituents, such as fat, soft connective tissue or like constituents, for example, are to be separated from the soft muscular tissue. Even with the application of modern processing methods and apparatus, only a relatively unsatisfactory degree of separation is achievable. A common known method of processing comprises, for example, the cutting up of the meat including bones or parts of bones and other constituents in a kind of meat grinder is carried out and the product cut up in this manner is led between a pressure conveyor and a screen drum (compare, for example, DE-OS 38 44 301 or DE-AS 17 82 800). In this process, on account of the cutting up in the meat grinder, a mixed mass of meat results, the soft constituents of which are then squeezed through the perforations in the drum in a kind of passing operation along the pressure conveyor. In this matter, constituents of a softer or harder consistency are separated from one another. However, a separation of the soft constituents from one another, as for example, a separation into muscular tissue, soft connective tissue and fat is not possible or only insufficiently so with this method of processing.

In order to improve the quality of the separating process, it has also been suggested to arrange the processing step of separation which follows the cutting-up step in a multi-stage manner such that screen drum-pressure conveyor-units are arranged one after the other having respectively reduced perforation sizes (compare, for example, DE-OS 15 07 972). Such a multi-stage passing or screen pressing does bring degrees of improvement. However, a satisfactory separation or division into muscular tissue, fatty tissue, connective tissue and hard connective tissue, cartilage and bone portions is not possible in this manner. In the initial cutting-up step and, in particular in the subsequent separating step, muscular tissue is subjected to high pressures, shear forces and other mechanical loads during the squeezing steps, which substantially destroy the structure of the muscular tissue so that a high-quality result cannot be achieved.

It is therefore an object of the present invention to provide a completely new method of processing and an apparatus which achieve a very high degree of separation for a treatment of the meat which is as careful as possible.

This object is solved in accordance with the invention in that the cutting up in the first step is followed by a dividing of the meat into planar pieces of a particular thickness, and that in a second step between the first step and the single or multi-staged separating process, a tenderizing of the planar pieces matched with this separating process is carried out.

The procedure of "mechanical tenderizing" has been known for a long time in meat processing. Under mechanical "tenderizing", a mechanical effect on the meat is understood which intentionally breaks up the structure of the meat. In this manner, the absorption of preservative substances and/or seasoning substances (pickling) is improved or the "tenderness" of the meat is also increased on account of the reduction in firmness.

In practice, the mechanical tenderizing of meat is achieved, for example, by means of roller systems which produce incisions, punctures, indentations or the like up to a certain predetermined depth into the meat (compare, for example, DE-OS 35 09 735). Apart from the improved absorption of preservative substances already mentioned, an improved binding of several meat pieces for the subsequent processing is caused in this known processing method.

In accordance with the invention, instead of the usual squeezing in the first step, a careful dividing of the meat into flat pieces such as slices, strips or cutlets takes place. In accordance with the invention, in a second step following this division, the product present in planar pieces is then purposefully mechanically tenderized before the actual separating process in such a manner that the "tenderizing pattern" is exactly matched with the "pattern" used in the subsequent separating process. In other words, if the separating process is carried out with a screen drum or screen conveyor arrangement, the incising, puncturing or indenting pattern of the mechanical tenderizing process is matched exactly with the perforation pattern of the screen drum or screen conveyor arrangment. The incisions or punctures of the mechanical tenderizing process are layed out in such a manner that a cutting raster ensues by means of which each portion of meat lying within the cut can be carefully pressed out in the subsequent separating process. In this case, the type and consistency of the meat plays an essential role. Thus, for example, in the case of a separating process by means of a pressing conveyor-screen drum arrangement with the same cutting pattern and the same pressure, tender meat can be pressed out through a smaller perforation than less tender or tough meat, for which in every case a larger perforation is required.

Tests have shown that planar pieces of meat purposefully tenderized in this manner can be treated considerably more effectively and carefully in the separating process than in known processing methods and apparatus. Thus, already in a single-staged separating process, a considerably improved degree of separation is achieved than with a comparative method of processing known in the art. If on the other hand the separating process is multi-staged, a previously unachievable degree of separation with highest quality can be achieved.

The matching of the thickness of the laminar pieces of meat to the mechanical tenderizing process is decisive for the degree of separation achieveable in the separating process. In accordance with the type or consistency of meat, the optimal thickness of the laminar pieces can be determined by means of tests.

It is fundamentally possible to conduct the separating process with any desirable number of stages. However, particularly advantageous results are achieved with a separating process which ensues via two or three stages. In such a case, the achieved degree of separation is weighed against the economically sensible structural input.

On account of the upstream, matched mechanical tenderizing Processing of planar pieces having an optimal thickness, in the case of a two- or three-stage separation process, the main quantity of muscular tissue is already separated in the first stage so that merely soft connective tissue, fatty tissue, sinews, fascia, ligaments, bones and cartilage remain. In the second stage, the separation of residue muscular tissue, fatty tissue and soft connective tissue ensues, the harder connective tissue, grizzle, ligaments, bones and fascia remaining. If a third stage is added, a further separation of residue muscular tissue, residue fat and soft residue connective tissue results so that merely sinews, cartilage and bones remain. In the case of application of known pressure conveyor-screen-drum-units for the individual stages, it is advantageous to reduce the perforation openings, which are matched with the upstream mechanical tenderizing process in every stage with regard to their cross-section.

The force of pressure applied in every stage onto the product to be treated is a further parameter. Tests have shown that it is advantageous to increase the pressure force from stage to stage.

On account of the tenderizing, it is been made possible not to apply the pressure onto the meat in the separating process over a large surface for a longer period of time, but to apply a pressure over a smaller surface area for a shorter period of time. If rollers or pressure conveyor-screen drum arrangements are applied, it is furthermore advantageous not to operate with a so-called zero separation, but to operate with a certain spacing between the pressure exerting surfaces. When a pressure conveyor is used, this can be done with a lower tension in the pressing conveyor.

In a multi-stage separation process, it is furthermore useful to arrange the spacing between the pressure-exerting surfaces in the first stage to be adjustable and controllable. The optimum conditions can be determined by tests in accordance with the type and consistency of the meat.

The degree of separation can also be improved in accordance with an advantageous development of the invention by means of the application of an intermediate stage between two stages. It is thus possible to use, for example, a flotation stage as the intermediate stage in which the separation ensues by means of flotation in water or solutions of salts and/or digestable acids admissible with respect to food laws.

For particular applications, as intermediate stages for the fine separation, adhesion separation processes, vibration table separation processes, centrifugal separation processes or possibly also air separation processes to utilize the different specific weights of fat and muscular tissue can possibly be used. Furthermore, it is also possible to use electronically controlled optical fine-separation processes as intermediate stages insofar as a separation is possible with respect to colour differences.

An advantageous apparatus for carrying out the inventive process comprises a cutting device for dividing the meat into planar pieces having a particular thickness, a tenderizing device for the planar pieces following this and a single or multi-staged separating device following this tenderizing device.

It is basically possible to apply known elements for the construction of the cutting device, the tenderizing device and the separating device. It is, however, essential that these known elements are designed to be set up and matched and adapted with respect to one another and to the processing method in such a manner that a processing method in accordance with the inventive process can be realized. Regarding the matching, the construction of the tenderizing device with respect to the separating device is of particular importance, as has already been described in connection with the inventive process.

Essentially, the cutting device, the tenderizing device and the separating device can be separated from one another. However, it is advantageous if the cutting device, the breaking-down device and the separating device are arranged in series in one machine unit.

The cutting device can be constructed in various ways. It is essential that the meat is divided into planar pieces of a certain thickness in a treatment which is as careful as possible. It is advantageous to provide the cutting device as a screw conveyor with a rotating knife arranged in series at the discharge side. Depending on the purpose type of application, a grid knife can be arranged upstream of this rotating knife.

The rotating knife can be a wing or a disk knife. The drive can ensue via the shaft of the screw conveyor in accordance with a preferred embodiment, which shaft is designed as a hollow shaft in this case.

The cutting device can also be a disk knife arrangement supported on a horizontal axis and co-operating with a transport conveyor.

In specific cases, it is also possible to cut the meat in a frozen condition. In this case, it is advantageous if the cutting device is a frozen meat block cutter. Such a block cutter can, for example, operate as a saw or milling device.

The mechanical tenderizing device can also be designed in various ways. It is advantageous if the mechanical tenderizing device has opposing tenderizing rollers rotating in opposite directions with respect to one another.

The through-movement of the planar meat pieces between the tenderizing rollers can ensue in different ways. In most cases it is sufficient to provide for the feed and discharge, as the planar meat pieces are conveyed through the tenderizing device by the tenderizing rollers themselves. Should this not be the case, it is advantageous to provide a special transporting device. In the case that the axes of the tenderizing rollers lie in a horizontal plane, gravitation usually suffices as a rule to move the planar meat pieces into the inlet area of the tenderizing rollers.

If required, it is possible to merely provide one tenderizing roller and to allow this to operate together with a conveyor which generates the required reaction pressure.

In order to make possible the optimal adaptation to the particular meat to be tenderized, it is advantageous to arrange the tenderizing rollers to be adjustable or convergeable. In accordance with a preferred embodiment, the tenderizing rollers consist of drive shafts upon which a number of toothed disks are arranged axially adjacent one another. It is advantageous in such an arrangment to arrange the drive shafts to be adjustable with respect to one another in terms of their spacing so as to be able to set the optimal operative gap between the tenderizing rollers through tests. On account of the arrangement of the tenderizing rollers with a number of toothed disks, it is possible to set up sets of toothed disks consisting of different toothed disks in accordance with the respective application.

Tenderizing rollers consisting of toothed disks can also be cleaned easily. For this purpose, the toothed disks are pulled off the drive shafts and individually cleaned in separate procedures.

The toothed disks consist of puncturing or incising teeth which are formed or arranged with respect to one another in accordance with a predetermined tenderizing pattern.

The separating device can also be structured in various ways. It can be single or multi-staged, the stages being similar or different.

A particularly good relationship between the degree of separation and the structural input is achieved with a two- or three-staged arrangement of the separating device.

The individual stages of the separating device can be formed as pressure conveyor-screen drum units, screen conveyor-pressure drum units, screen drum-screen drum units or screen drum-pressure roller units. Furthermore, it is possible to design the individual stages of the separating device as pressure drum-screen drum units. In this case, a rotating axially displaced screen or pressure drum of smaller diameter operates within the pressure or screen drum. On account of the displacement of both axes, an operating gap is formed between the inner surface of the outer drum and the outer surface of the inner drum, the gap constantly reducing and subsequently constantly increasing.

With a screen drum-pressure roller unit, a pressure roller respectively lies axially parallel opposite the screen drum. This pressure roller can be of elastic material or also be elastically deformable.

In the case that the pressure roller is arranged to be elastically deformable, it is advantageous that it is arranged as a hollow pressure body upon the inside of which a pressure medium can act. In such an arrangement, the pressure roller experiences a deformation in its region of pressure lying opposite the screen drum, which deformation, depending on the desired pressure surface, can extend over a certain angular area of the screen drum. An angular area of approximately 30° to 50° is advantageous.

The meat pressed into the inside of the screen drum can basically be withdrawn in any desired manner. For example, known scraping or other removal devices are suitable. In accordance with an advantageous development of the invention, the withdrawl of the meat from the inside of the screen drum can also ensue by means of a suction device which is arranged in the inside of the drum in the region of its overlapping with the pressure rollers. This suction device can be arranged in various ways. Advantageously, it is formed as a suction hood which covers a certain sector of the drum interior.

The separating device can also be designed as a toothed drum arrangement. In this case two axially parallel toothed drums lie opposite one another to form a toothed drum pair. The teeth of the toothed drums can be plain, helical or even herringbone-shaped in accordance with the respective application.

The teeth of the toothed drums can be arranged in different ways. For example, the teeth can be integrally formed with the toothed drum. It is also advantageous to form the teeth of the toothed drums in toothed bars which are placed onto the drum body.

However, in all described cases it is essential that openings which join with the inner space of the drum are respectively provided between two teeth at the bases of the teeth. Thus, such toothed drum arrangements are actually a screen drum arrangement with specific, tooth-like peripheral surfaces.

Basically, the opening or slits can be designed in many different ways. In order to achieve a passage of the meat through the openings or slits which is as trouble-free as possible, it is advantageous to arrange the openings or slits such that they widen in the direction towards the interior of the drum. Usefully, the widening is essentially conical.

Particularly meaning is also placed in the formation of the openings or slits in the region of transition to the peripheral surface of the drum. In accordance with the respective application, this transition can, for example, be rounded off or arranged as a kind of cutting edge. In the case of a toothed drum arrangement, it is useful if the toothed drums are arranged at a distance from another, i.e. to form a "wave-shaped" gap between the toothed system facing one another.

It is advantageous in such a case to drive the toothed drums synchronously such that the tip of a tooth of one drum lies opposite the base of a tool of the adjacent drum. In this way, the meat is squeezed by the tip of a tooth of the one drum through the opening or slit in the base of a tooth of the respectively adjacent drum, whereby a quasi pulsation squeezing or passing action results having effect alternatively from either side on the planar meat pieces.

Figure 2:
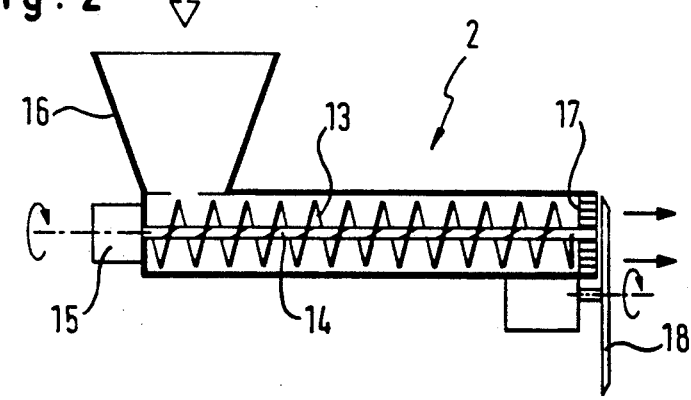
Figure 3:
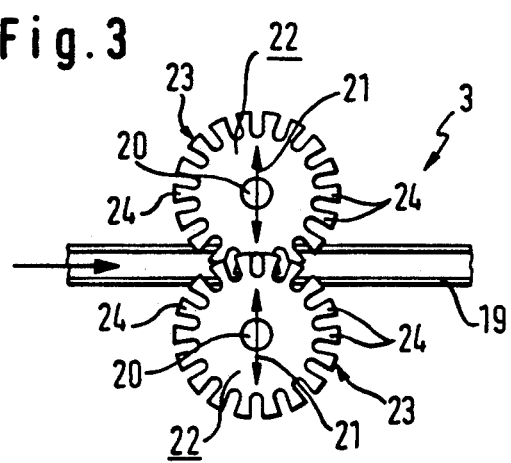
Figure 4:
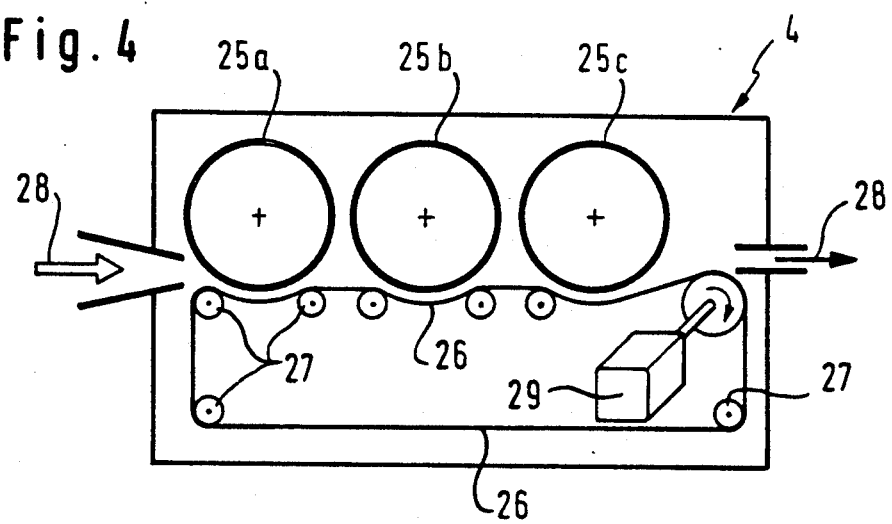
Figure 5:
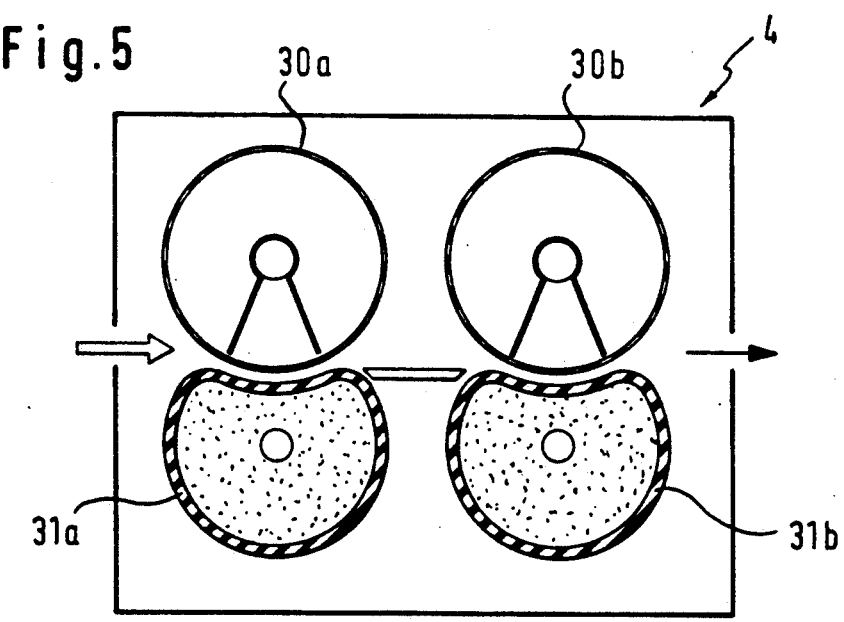
Figure 6:
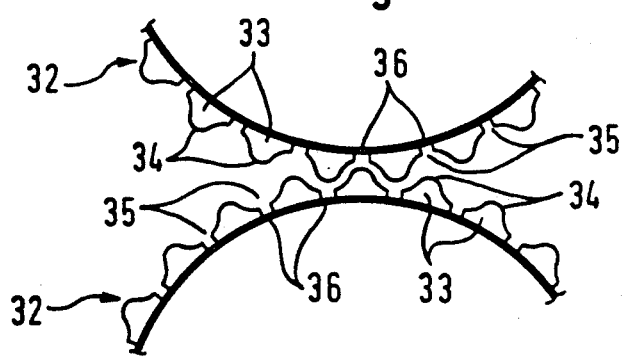

For the further explanation and for a better understanding of the invention, exemplified embodiments of apparatus operating in accordance with the inventive process are described in detail in the following with reference to the drawings, in which:

FIG. 1 shows in the form of a block diagram the basic structure of an apparatus according to the invention arranged as a machine unit 1 comprising a cutting device 2, a tenderizing device 3 and a separating device 4, FIG. 2 schematically shows an embodiment of the cutting device 2, FIG. 3 schematically shows an embodiment of the tenderizing device 3, FIG. 4 schematically shows a first embodiment of a separating device 4 arranged with three stages, FIG. 5 schematically shows a second embodiment of the separating device arranged with two stages, and FIG. 6 schematically shows a detail of a further embodiment of a separating device 4.

In accordance with the block diagram depicted in FIG. 1, the meat having all constituents such as muscular tissue, bones, ligaments, cartilage, fascia, connective tissue, fat and the like is fed via a transporting device schematically shown with an arrow 5 to the cutting device 2. In the cutting device 2, the meat including its constituents is divided into planar pieces. These planar pieces are led to the tenderizing device 3 via a feed device schematically shown as an arrow 6, the pieces being mechanically tenderized in accordance with an precisely predetermined pattern.

The pieces mechanically tenderized in this way then pass into the separating device 4 via a feed device shown as an arrow 7, which separting device must consist of at least one stage 4a. However, it is advantageous if the separating device 4 consists of two or three stages, as depicted in the block diagram according to FIG. 1 with dashed lines. The second and third stages are shown as 4b and 4c in the block diagram according to FIG. 1. The separating process initially described takes place in the stages 4a, 4b and 4c, wherein the separating process can be carried out with a very high degree of separation in accordance with the invention on account of the upstream and precisely determined mechanical tenderizing process in the tenderizing device 3. On account of this arrangement, already in the first stage 4a of the separating device 4, the main quantity of muscular tissue shown as an arrow 8 in the block diagram according to FIG. 1 is separated. In the transfer into the second stage 4b, merely residue muscular tissue, soft connective tissue, fatty tissue, sinews, fascia, ligaments, cartilage and bones do remain.

In the second stage 4b, a separation of residue muscular tissue, fatty tissue and soft connective tissue then takes place, as indicated by an arrow 9 in the block diagram according to FIG. 1. Harder connective tissue, fascia, ligaments, bones and cartilage remain and are led on to the third stage 4c. In this third stage, a further separation of residue muscular tissue, residue fat and soft residue connective tissue takes place, which is symbolically depicted with an arrow 10. The remaining sinews, cartilage and bones are removed at the end of the third stage 4c, as shown with an arrow 11 in FIG. 1.

As initially revealed, if required, the degree of separation can be improved by means of the application of intermediate stages in accordance with an advantageous development of the invention. These intermediate stages are not shown in FIG. 1. As already described, they serve for fine separation. The constituents separated in these intermediate stages are shown schematically in the block diagram according to FIG. 1 with the arrows 12a and 12b.

The embodiment of a cutting device 2 shown in FIG. 2 consists of a screw feeder 13 which pushes meat fed via a hopper 16 carefully past a disk knife arranged at the discharge end. Disks knives are known in principle and produce pieces of meat of exact geometrical dimensions which are then cut to a desired length by means of a downstream, rotating knife 18.

In accordance with the invention, the division of the meat in the cutting device 2 produces planar pieces of a defined thickness.

In FIG. 3, an embodiment of a tenderizing device 3 is schematically shown in which the planar pieces of a defined thickness are mechanically tenderised in accordance with a precisely determined pattern.

In the present embodiment, the tenderizing device 3 comprises a transport device 19 which is shown to be channel-shaped for simplicity.

To both sides of the transport device 19, drive shafts 20 are provided which can be moved towards and away from one another in the direction of the arrows 21. Toothed disks 22 are arranged axially adjacent one another on the drive shafts 20 so that tenderising rollers 23 are formed which act on both sides of the planar pieces of a certain thickness. The toothed disks 22 are provided with incision or puncturing teeth 24 in their peripheral regions which are formed and arranged with respect to one another in accordance with the tenderizing pattern already revealed.

In the case of the separating device 4 schematically shown in FIG. 4, this relates to a three-staged screen drum-pressure conveyor arrangement. In this embodiment, there are three screen drums 25a, 25b and 25c with their axes respectively parallel and arranged behind one another at a certain distance apart. On the underside of the screen drums 25a, 25b, 25c a pressure conveyor 26 is led over a roller 27 such that the planar pieces of meat mechanically tenderised in the tenderizing device 3 are first led one after the other under the screen drum 25a and subsequently under the screen drums 25b and 25c. The direction of operation of the separating device shown in FIG. 4 is indicated by arrow 28. The pressure conveyor 26 is driven via a drive 29 or several driving pressure rolls. The drive of the screen drum is not shown.

The size of the perforations in the screen drum, the length of the pressure gap between the pressure conveyor 26 and the associated screen drum surface, the width of the pressure gap and the pressure against the planar pieces of meat are determined and set with respect to the respective requirements in accordance with tests for the respective types of meat and consistency in a known manner. While the harder meat constituents parts leave the separating device 4 at the discharge side via the pressure conveyor 26, the softer meat constituents parts are withdrawn from the inside of the screen drums in a known manner by a scraping or conveying device not shown.

In the two-stage separating device 4 schematically shown in FIG. 5, screen drums 30a and 30b are also used. However, instead of a pressure conveyor, pressure rollers 31a and 31b are arranged opposite the screen drums 30a and 30b, the rollers being made from an elastic, deformable material, as, for example specialized rubber oder plastic, and are constructed as hollow pressure bodies. By means of devices not shown, the hollow pressure bodies are acted upon by a pressure medium in their interior, as for example air or fluid.

As can be seen in FIG. 5, the arrangement has been made such that the pressure rollers 31a and 31b surround the screen drums 30a and 30b over a certain angle of their periphery. The angle is selected in accordance with the respective meat to be processed and the dimensions of the planar pieces and amounts preferably to between 30° and 50°. The pressure force can also be controlled via the pressure of the pressure medium. Otherwise, the embodiment according to FIG. 5 operates in the same manner as the embodiment according to FIG. 4.

In FIG. 6, a detail of a further embodiment is depicted. The gap through which the planar meat of a certain size mechanically tenderised in the tenderizing device 3 is led is formed by the gap between two toothed drums 32, of which only a part of the periphery is schematically shown. These toothed drums 32 consist in the region of their periphery of rounded-off teeth 33. These teeth in turn consist of rounded or teethed tips 34. Between two teeth 33, a teeth base 35 formed in accordance with the shape of the opposing teeth tips 34 is provided which has openings or slits 36 through which a connection from the toothed drum peripheral surface to the drum interior is made. The toothed drums 32 are thus screening drums with toothed peripheral surfaces.

The toothed drums 32 of each toothed drum pair are arranged at a distance from one another in order to form the gap, as can be seen in FIG. 6. They are synchronuously driven in such a manner that each tooth tip 34 of one toothed drum lies opposite the tooth base 35 of the adjacent toothed drum. Thus, a "wave-shaped" gap is formed, as can be clearly recognized in FIG. 6. The soft constituent parts of the meat are pressed through the openings or slits 36 into the inside of the toothed drums and then removed from these in a known manner. However, the unusual feature of this arrangement lies in that the pressing action ensues alternatively and thus in the form of pulses to the one and the other side while the meat is moved through the "wave-shaped" gap. On account of such an arrangement, a particularly high degree of separation ensues with careful treatment.

What is claimed is:

1. Process for processing meat, comprising the steps of,
    cutting up the meat by dividing the meat into planar pieces of a certain thickness,
    mechanically tenderizing the planar pieces; and
    separating the tenderized pieces of meat into constituents using a pattern that is matched to a tenderizing pattern used in performing said tenderizing step.

2. Process according to claim 1, wherein the separating process following the mechanical tenderizinig process takes place over two or three stages.

3. Process according to claim 2, wherein the pressure applied to the meat during the separating process is increased from stage to stage.

4. Process according to claim 2, wherein a comparatively high specific pressure acts on the meat over a relatively short period of time.

5. Process according to claim 3, wherein the pressure is exerted on the meat over areas, the distances between each of which are adjustable and are reduced from stage to stage.

6. Process according to claim 1, wherein at least one intermediate stage for fine separation is provided between the mechanical tenderizing process and the following separating process.

7. Process according to claim 2, wherein at least one intermediate stage for fine separation is provided between the two stages.

8. Process according to claim 6 or 7, wherein the intermediate stage operates as a flotation stage.

9. Process according to claim 6 or 7, wherein the intermediate stage operates as an air separation stage.

10. Process according to claim 6 or 7, wherein the intermediate stage operates as an optical separation stage.

11. Process according to claim 6 or 7, wherein the intermediate stage operates according to the adhesion separating process.

12. Process according to claim 6 or 7, wherein the intermediate stage operates according to the vibration table separating process.

13. Process according to claim 6 or 7, wherein the intermediate stage operates according to the centrifugal separating process.

14. Apparatus for processing meat, comprising a cutting device for dividing the meat into planar pieces of a certain thickness, a tenderizing device for mechanically tenderizing the planar pieces using a tenderizing pattern, and a separating device for separating constituents of the tenderized pieces using a pattern that matches said tenderizing pattern.

15. Apparatus according to claim 14, wherein the cutting device, the tenderizing device and the separating device are consecutively arranged in series.

16. Apparatus according to claim 15, wherein the cutting device, the tenderizing device and the separating device are combined as one machine unit.

17. Apparatus according to claim 14, wherein the cutting device has a screw feeder with a rotating knife connected at the outlet side thereof.

18. Apparatus according to claim 14, wherein the cutting device has a screw feeder with a single or double grid knife arranged at the outlet side thereof.

19. Apparatus according to claim 17, wherein a grid knife is arranged upstream of the rotating knife.

20. Apparatus according to claim 14, wherein the cutting device comprises a disk knife arrangement guided on a horizontal axis and cooperating with a transport conveyor.

21. Apparatus according to claim 14, wherein the cutting device is a frozen meat block cutter.

22. Apparatus according to claim 21, wherein the frozen meat block cutter is a sawing or milling device.

23. Apparatus according to claim 14, wherein the tenderizing device has counter rotating tenderizing rollers lying opposite one another.

24. Apparatus according to claim 23, wherein the planar meat pieces can be fed between the tenderizing rollers via a transport device.

25. Apparatus according to claim 23, wherein the axes of the tenderizing rollers lie in a horizontal plane and the planar pieces of meat can be guided through the tenderizing rollers by means of gravitational force.

26. Apparatus according to claim 14, wherein the tenderizing device has a tenderizing roller and a conveyor belt cooperating with this.

27. Apparatus according to claim 23, 24 or 25 wherein the tenderizing rollers comprise drive shafts upon which a number of toothed disks are arranged axially adjacent one another.

28. Apparatus according to claim 27, wherein the drive shafts are adjustable in their distance from one another.

29. Apparatus according to claim 27, wherein the toothed disks can be combined into toothed disk sets.

30. Apparatus according to claim 27, wherein the toothed disks have incision or puncturing teeth matched with the separating process in the separating device following in series.

31. Apparatus according to claim 14, wherein the separating device has at least one pressure conveyor-screen drum unit.

32. Apparatus according to claim 14, wherein the separating device has at least one screen conveyor-pressure drum unit.

33. Apparatus according to claim 14, wherein the separating device has at least one screen drum which respectively lies opposite a pressure roller arranged axially parallel thereto.

34. Apparatus according to claim 14, wherein the separating device has at least one screen drum-screen drum unit.

35. Apparatus according to claim 14, wherein the separating device has a pressure or screen drum and a rotating, axially displaced screen or pressure drum of smaller diameter in its interior.

36. Apparatus according to claim 33, wherein the pressure roller consists of elastic material.

37. Apparatus according to claim 36, wherein the pressure roller is elastically deformable.

38. Apparatus according to claim 37, wherein the pressure roller covers the screen drum over an angular area of approximately 30° to 50°.

39. Apparatus according to claim 37 or 38, wherein the pressure roller is a hollow pressure body and is acted upon by a pressure medium within its interior.

40. Apparatus according to claim 36, 37 or 38, wherein the screen drum is equipped with a suction device in its interior in the region of coverage by the pressure roller.

41. Apparatus according to claim 40, wherein the suction device is a suction hood.

42. Apparatus according to claim 14, wherein the separating device has at least one toothed drum pair.

43. Apparatus according to claim 42, wherein the toothed drums of the toothed drum pair have openings or slits in the teeth bases which join with the drum interior.

44. Apparatus according to claim 42 or 43, wherein the toothed drums have straight, helical or herringbone teeth.

45. Apparatus according to claim 42, wherein the teeth of the toothed drums are formed by toothed bars.

46. Apparatus according to claim 43, wherein the openings or slits joining with the drum interior widen towards the drum interior.

47. Apparatus according to claim 46, wherein the widening is essentially conical.

48. Apparatus according to claim 46 or 47, wherein the transitions of the openings or slits into the peripheral surface are arranged to have a cutting edge.

49. Apparatus according to claim 42 or 43, wherein the toothed drums are arranged at a distance from one another and the respective teeth tips are synchronuously driven with respect to the teeth bases.

* * * * *